Oct. 24, 1950   C. F. JONES   2,526,821
GRASS CUTTER
Filed Aug. 26, 1949

INVENTOR.
CERNYW F. JONES,
BY
McMorrow, Berman + Davidson
ATTORNEYS.

Patented Oct. 24, 1950

2,526,821

UNITED STATES PATENT OFFICE 2,526,821

GRASS CUTTER

Cernyw F. Jones, Economy, Ind.

Application August 26, 1949, Serial No. 112,433

1 Claim. (Cl. 56—249)

This invention relates to grass cutters, and more particularly to a grass cutter in the form of a mower adapted to be propelled over a lawn or other grass-covered area.

It is among the objects of the invention to provide an improved grass cutter or mower which has no reciprocating parts and hence, is not subject to vibration or uneven operation and yet is effective to cut tall grass and weeds as well as short lawn grass, which can be made of substantially any desired width without changing its length or depth, and utilizes a number of closely-spaced cutting blades to provide a smooth, even cut, which requires a minimum amount of power for its operation and utilizes power at a smooth, uniform rate, which is easy to sharpen and repair, and which is simple and durable in construction, economical to manufacture, and neat and attractive in appearance.

Other objects and advantages will become apparent from a consideration of the following description and the appended claim in conjunction with the accompanying drawing, wherein:

Figure 1:
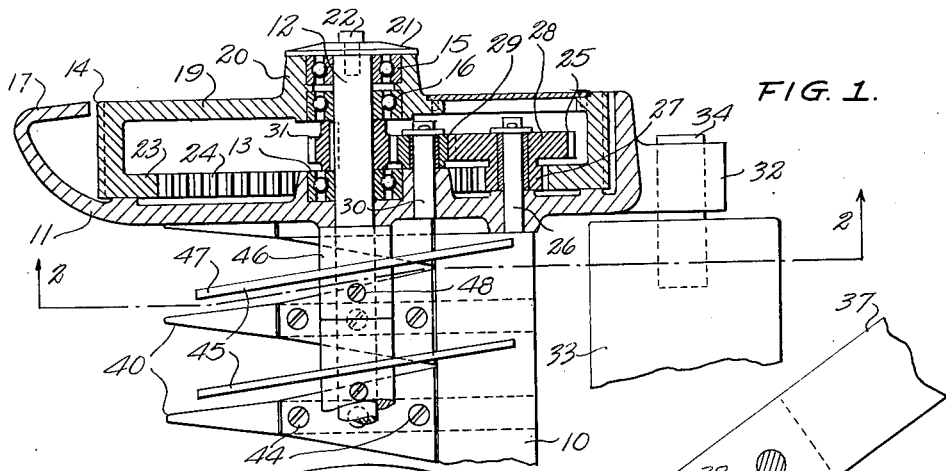
Figure 1 is a top plan view of a fragmentary end portion of a mower constructed according to the present invention, a portion being broken away and shown in cross-section to better illustrate the construction thereof.
Figure 2:
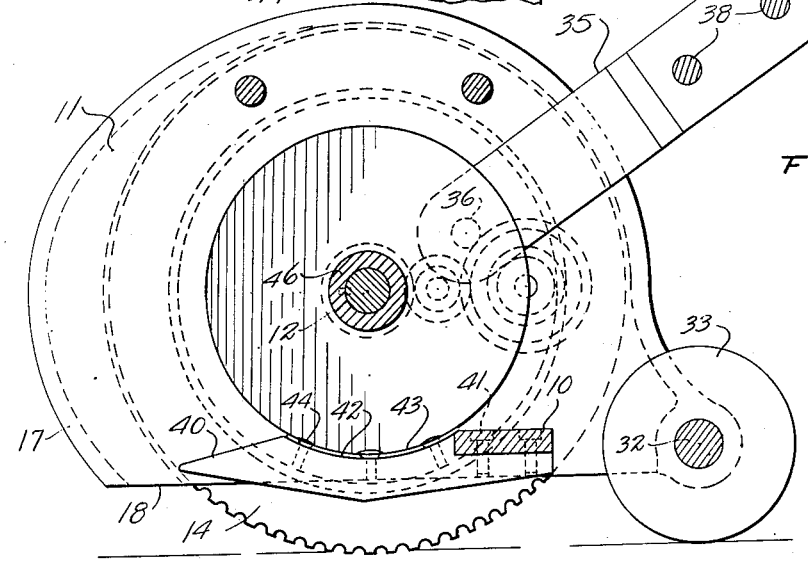
Figure 2 is a transverse cross-section on the line 2—2 of Figure 1.
Figure 3:
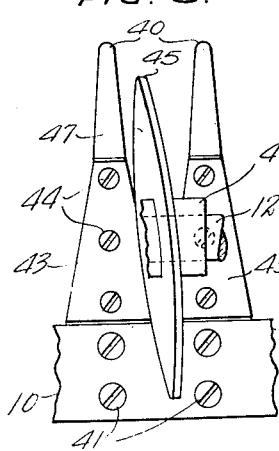
Figure 3 is a top plan view of a fragmentary part of the mower showing the parts in one operative condition.
Figure 4:
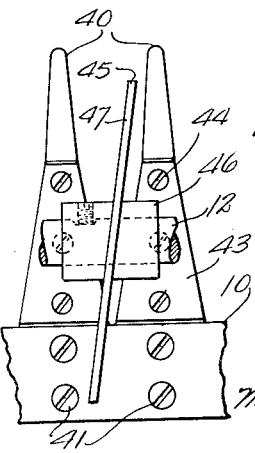
Figure 4 is a view similar to Figure 3 showing the parts in a different operative position.

With continued reference to the drawing, the mower comprises an elongated frame bar 10 and a pair of hollow, side frame members secured to the bar 10 at respectively-opposite ends of the latter, one of these side frame members being particularly illustrated in Figures 1 and 2, and indicated at 11.

A shaft 12 is journaled near its opposite ends in the frame side members by suitable anti-friction bearings 13, and a pair of ground-engaging wheels 14 are journaled on the shaft 12 at respectively-opposite ends of the shaft by suitable means, such as the double anti-friction bearings, as indicated at 15 and 16, mounted on the shaft at locations spaced outwardly from the adjacent frame-carried bearings 13.

The wheels 14 are substantially enclosed in the corresponding hollow, side frames 11, these frames being curved around the front sides of the wheels, as indicated at 17, to provide guards which not only protect the wheels from heavy contact with obstacles, such as stones or roots, but also serve to guide the grass or equivalent growth into the space between the side frames where it will be operated on by the cutting mechanism of the mower. Each side frame is cut away at its bottom side, as indicated at 18, to expose the lower portion of the corresponding wheels 14 for contact with the ground.

Each wheel is provided, at one side, with a web 19 which is provided at its center with a hub boss 20 surrounding the bearings 15 and 16 to mount the wheel on the shaft 12, the wheel being retained on the shaft by a suitable thrust washer 21 overlying the outer end of the hub boss and secured to the corresponding end of the shaft by suitable means, such as the cap screw 22.

At its opposite or inner side, each of the wheels 14 is provided with an annular flange 23 provided in its edge with gear teeth 24 and constituting an internal ring gear for driving the shaft 12.

A compound gear 25 is journaled on an axle pin 26 secured at one end in an aperture provided in the side frame 11, and this gear includes a small gear part 27 meshing with the internal ring gear 24, and a large gear part 28 meshing with an idler gear 29 mounted on an axle pin 30 also journaled in the side frame 11 at a location spaced from the pin 26.

A gear 31 secured on the shaft 12 meshes with the idler gear 29, so that, when the wheels 14 are rotated incident to the mower being propelled over the ground, the shaft 12 is rotated at an increased speed. This driving means is preferably duplicated at each end of the shaft 12 and may, if desired, include a one-way drive unit.

While an efficient and practical means has been illustrated and described for driving the shaft 12, it is to be understood that other means may be employed for this purpose without, in any way, exceeding the scope of the invention.

An apertured lug 32 projects from the rearward side of each side frame 11, that is, the side of the frame opposite the guard 17, and a roller 33 is journaled to the frame by means of these lugs, pintles 34 extending respectively through the lugs 32 and being secured in the roller 33 at the respectively-opposite ends of the latter.

In a lawn mower adapted to be manually pushed over the lawn or other area, a yoke 35 is pivotally connected at its opposite ends to the side frames 11 respectively, by suitable means, such as the pins 36 projecting inwardly from the side frames and extending through apertures provided in the yoke near the opposite ends of the latter, and a handle 37 is secured to the yoke by suitable means, such as the bolts 38.

A plurality of guards 40 are secured in contiguous, side-by-side relationship to the bar 10. Each of these guards is provided near its rear end with a recess which receives the bar 10, so that the guard underlies the bar and projects forwardly therefrom. The guards may be secured to the bar by suitable means, such as by welding or by the cap screws 41 extending through apertures in the bar 10 and threaded into the guards 40. Each of the guards is symmetrically tapered from its rear to its front end, so that narrow, V-shaped spaces are provided between adjacent guards, and each guard is provided, in its upper surface, with an arcuately-curved concavity 42. A cutting blade 43 overlies the arcuately-curved concavity on each guard and is secured to the associated guard by suitable means, such as the screws 44. Each of these cutting blades has two cutting edges disposed along the respectively-opposite, longitudinal sides thereof. The rear ends of the cutting blades are disposed substantially in contact with the front edge of the frame bar 10, and the two cutting edges of each blade converge symmetrically in a direction away from and forwardly of the frame bar, so that a V-shaped notch is provided between the adjacent cutting edges of each two adjacent blades.

A plurality of cutting discs 45 are mounted on the shaft 12 in spaced-apart relationship, such that each disc is centered over a respective notch between the adjacent cutting edges of two adjacent blades. Each disc comprises a tubular hub portion 46 which receives the shaft 12, and a web portion 47 extending radially from the hub. The hubs are preferably made of a length such that the discs are properly spaced when adjacent ends of contiguous hubs are in contact with each other, and each hub is secured to the shaft against rotation relative thereto by suitable means, such as a set screw 48 threaded through a screw-threaded aperture in the hub and bearing at its inner end against the shaft 12.

The web portions 47 of the discs 45 have a diameter such that they peripherally engage the adjacent cutting blades 43, and these webs are skewed or obliquely disposed relative to the axis of rotation of the shaft 12, so that as the shaft rotates the discs will wobble relative to the cutting blades and their peripheries will move laterally relative to the cutting edges of the blades.

The wiping action of the peripheries of the discs 45 over the adjacent cutting blades 43 will shear off grass or other plants entering the V-shaped notches between adjacent cutting blades with a smooth shearing, rather than a chopping action. As the notches between adjacent blades may be made quite narrow, a moderate angle of obliquity of the discs relative to the rotational axis of the disc-carrying shaft is sufficient to provide a shearing action along the entire length of the cutting edges of the cooperating blades, so that a large mechanical advantage is obtained and the shaft 12 does not require an excessive amount of power to drive it and the discs. Also, the skewed discs are preferably arranged at different rotational angles around the shaft 12, so that an equal number of the discs are cutting at all times and there are idle periods between cutting periods of the discs and also so that the different discs cut in opposite directions to substantially eliminate end thrust on the disc-carrying shaft. For example, the obliquity of the successive discs may be spirally arranged from each end to the center of the shaft 12, so that all of the discs between each end of the shaft and the center thereof will be at different positions relative to the corresponding cutting edges of the blades, either adjacent or remote from the center of the mower.

Various other arrangements of the discs may be utilized without, in any way, exceeding the scope of the invention.

When it is necessary to sharpen the mower, the discs may be ground concentrically of the rotational axis of the shaft 12 by an ordinary lawn mower sharpening machine, and the cutting blades may be easily removed and sharpened individually. If any important amount of material is removed from the peripheries of the discs in the sharpening process, suitable shims may be placed under the cutting blades to obtain the proper wiping action of the peripheries of the discs over the cutting edges of the blades.

As the discs are individually cutting at different degrees, the shaft 12 is rotated by a smooth and even flow of power without periodic variation, and as there are no reciprocating parts and no chopping action, at any time, there is substantially no vibration or uneven operation of the mower.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A lawn mower comprising a pair of hollow side frame members disposed in spaced apart relationship, a bar extending between and secured at its opposite ends to said side frame members, a shaft spaced from and substantially parallel to said bar and journalled at its ends in said side frame members, ground engaging wheels disposed one in each of said side frame members and journalled on said shaft, a speed increasing gear train drivingly connected between at least one of said wheels and said shaft, a plurality of contiguously arranged guards secured to said bar and projecting laterally from one side of the latter, outwardly tapered blades secured one on each of said guards, and a plurality of disks secured on said shaft at spaced apart locations therealong and obliquely disposed relative to the axis of rotation of said shaft, each of said disks peripherally engaging a corresponding cutting blade and said disks wiping laterally across said blades to cut material against the side edges of the latter.

CERNYW F. JONES.

REFERENCES CITED

The following references are of record in the file of this patent:

UNITED STATES PATENTS

| Number | Name | Date |
| --- | --- | --- |
| 2,282,238 | Newton | May 5, 1942 |
| 2,484,071 | Brauer | Oct. 11, 1949 |